Oct. 30, 1962  E. R. KNOWLES  3,060,507
MOLDING APPARATUS AND METHOD
Filed April 14, 1959  3 Sheets-Sheet 1
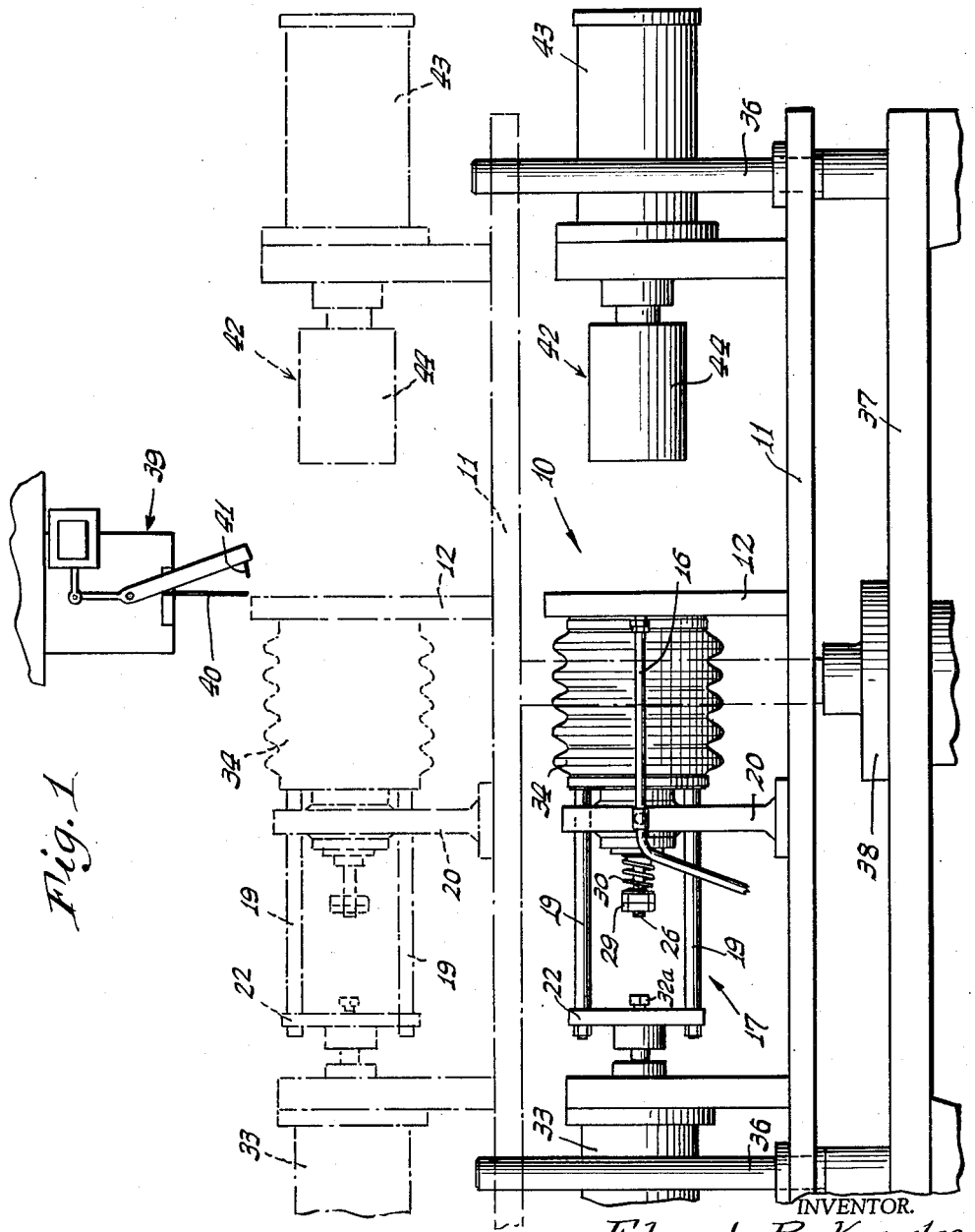
INVENTOR.
*Edward R. Knowles*
BY
*Johnson and Kline*
ATTORNEYS

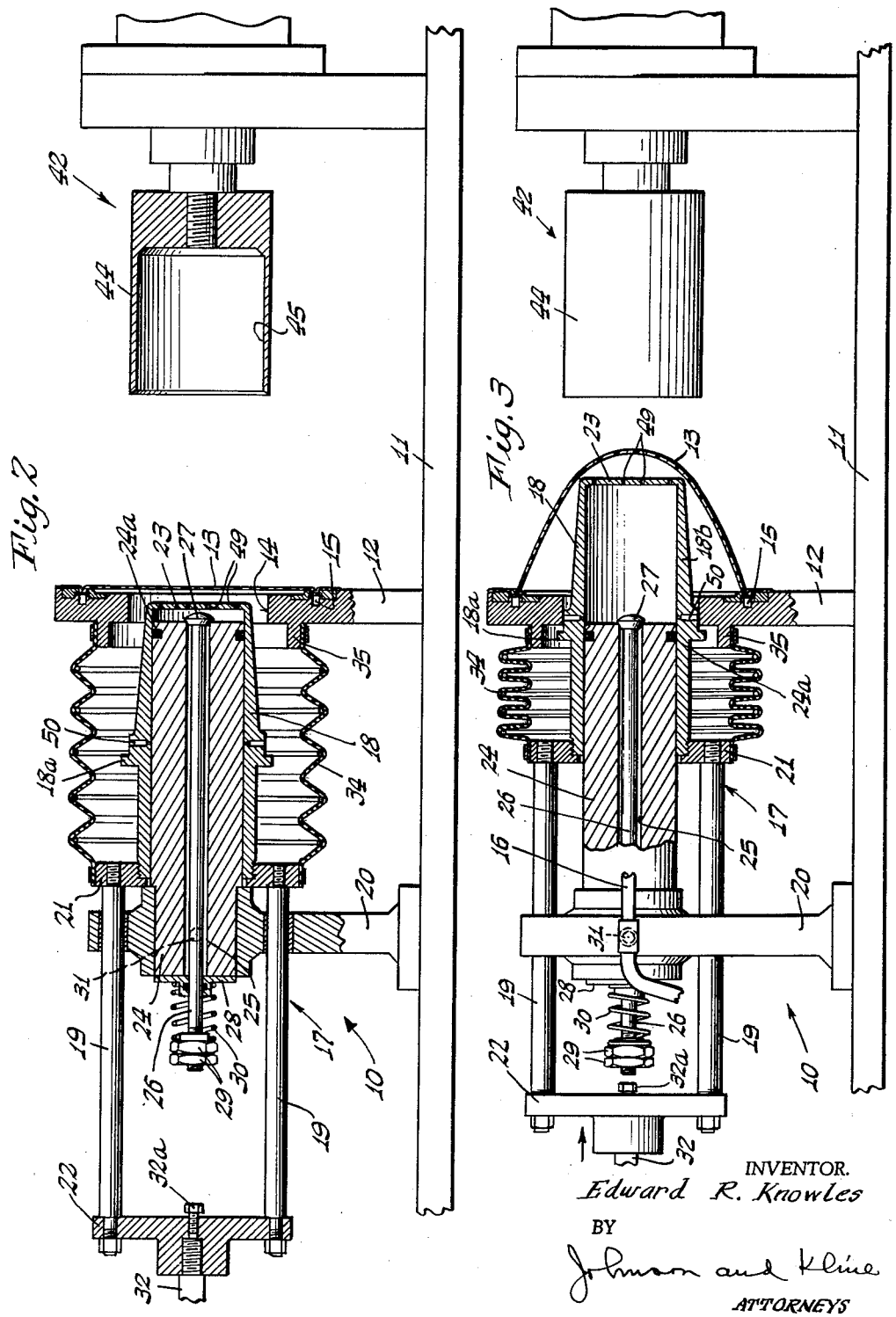

Oct. 30, 1962  E. R. KNOWLES  3,060,507
MOLDING APPARATUS AND METHOD
Filed April 14, 1959  3 Sheets-Sheet 3
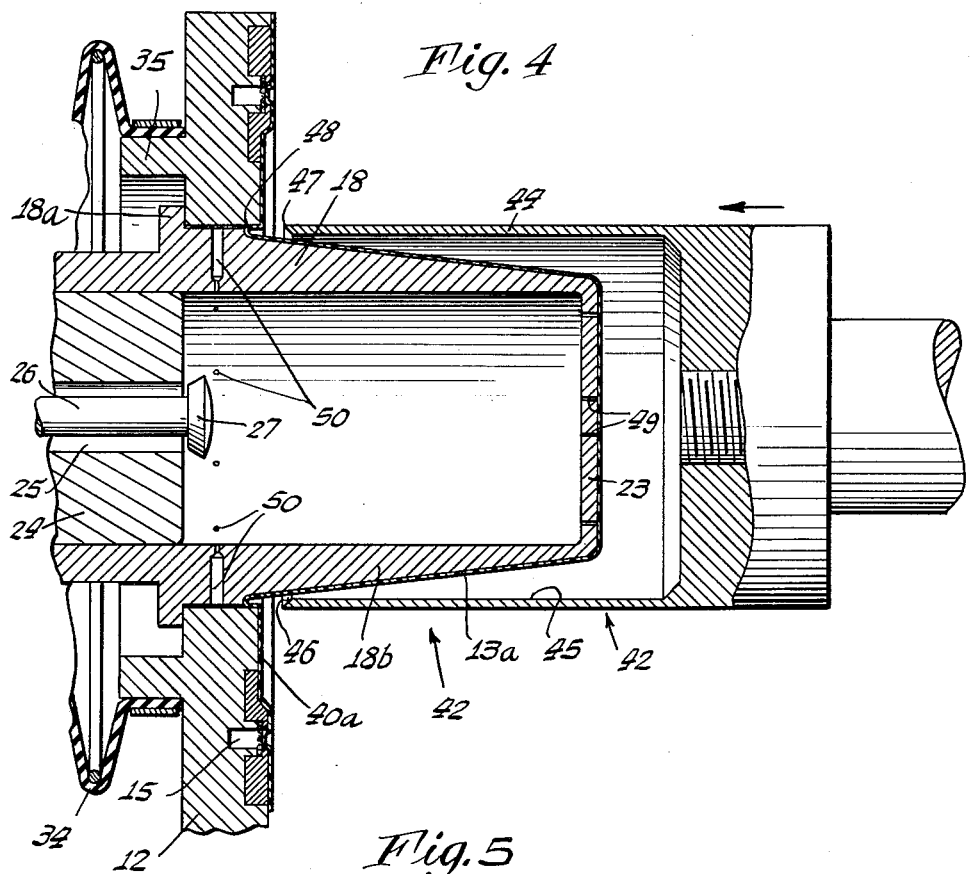
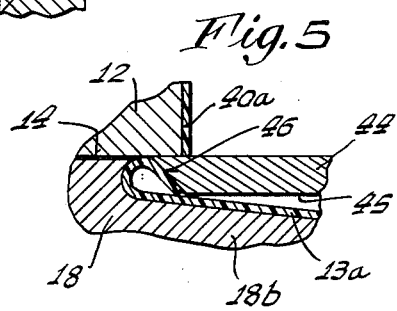
INVENTOR.
Edward R. Knowles
BY
Johnson and Kline
ATTORNEYS

United States Patent Office 3,060,507
Patented Oct. 30, 1962

3,060,507
MOLDING APPARATUS AND METHOD
Edward R. Knowles, 437 Reef Road, Fairfield, Conn.
Filed Apr. 14, 1959, Ser. No. 806,254
8 Claims. (Cl. 18—19)

This invention relates to the molding of plastic articles. More specifically, it pertains to an apparatus and method for molding hollow articles from plastic sheet material.

Prior to the instant invention problems were encountered in the molding of hollow articles from moldable sheet material. It was the practice to move a forming die into engagement with a peripherally retained sheet to distort and stretch it and thereafter to draw the distorted sheet onto the surface of the die to be there molded into shape. It was found, when following this method, that undesirable strain areas were formed in the finished article in the areas initially contacted by the die and that the material adjacent these areas was thinned during the drawing or distorting of the sheet substantially more than other areas thereof.

The present invention overcomes these problems by providing a method and apparatus in which the moldable material is uniformly distorted prior to its being contacted by the die so that, on sucking the material onto the die surface for molding, distribution of the material is uniform thereover, with a resultant elimination of strains and thinned areas.

It is, therefore, an object of the invention to provide a method for molding hollow articles from sheet material which substantially eliminates the causes of strain spots in the finished article and results in a uniformly molded product.

It is also an object of the invention to provide an apparatus for molding hollow articles, wherein the sheet material from which the article is formed is uniformly distorted in advance of and away from the forming die, so that in a subsequent vacuum forming operation the sheet is evenly disposed on the molding surface of the die and not drawn across portions thereof.

A feature of the invention is the provision of means for blowing a sheet of plastic material, which is operated in relation to the relative movement of the forming die and sheet toward one another, so that the sheet is uniformly distorted away from the die.

Another object of the invention is to provide a molding apparatus wherein, simultaneously with the movement of a forming die toward the molding portion of a sheet of moldable material, a bellows operated in response to the movement of the die blows the material in advance of and away from the die so that in a subsequent vacuum forming operation the material will be uniformly drawn onto the molding surface of the die.

Yet another object of the invention is to provide a molding apparatus in which the forming die is mounted by a carrier for movement toward a sealingly retained sheet of plastic material for molding the same and the bellows is operated by the carrier in relation to the movement of the die so that the sheet material is uniformly blown away from the die and thereafter, when the die has reached molding position, a vacuum means, operated by the means for moving the carrier, draws the sheet onto the molding surface of the die.

It is further an object of the invention to provide, in an apparatus for molding hollow articles from sheet material, a material supporting member for retaining the sheet and defining a molding portion thereof, which is adapted to cooperate first with a forming die and bellows to distort the molding portion in advance of and away from the die, then with the die and a vacuum means to draw the material onto the surface of the die to mold the same and thereafter with means for trimming and beading the edge of the finished molded article.

It is still further an object of the invention to provide an apparatus for molding articles from sheet material, which is completely automatic, readily operated by unskilled persons and adapted to modern high speed production requirements.

Other objects and advantages of the invention will be apparent from the specification and claims when considered in connection with the attached sheets of drawings, illustrating one form of the invention, wherein like characters represent like parts and in which:

FIGURE 1 is a side elevational view of a molding apparatus emboying the concepts of the invention and showing in solid and broken lines the operating and sheet material receiving positions of the apparatus respectively;

FIG. 2 is a side elevational view, broken away and partially in section, of a molding apparatus with a sheet of plastic material retained thereon preparatory to a molding operation;

FIG. 3 is a view similar to FIG. 2, but showing the relative positions of the sheet and molding die just prior to the molding operation;

FIG. 4 is a fragmentary view, broken away and in section, showing the molding die with sheet material formed thereon and an article trimming and beading device; and FIG. 5 is an enlarged fragmentary detail view, broken away and in section, showing the trimming and beading of the molded article.

According to the invention, hollow articles are molded from sheets of moldable material by stretching a predetermined quantity of the sheet material across a supporting member, having an opening therein, to define a molding portion thereof and peripherally retaining the sheet in sealing engagement with the supporting member, by vacuum or similar means, for a subsequent molding operation. After the sheet has been positioned on the supporting member and the molding portion has been defined, a forming die or core is moved toward the sheet through the supporting member while, simultaneously, the molding portion is distorted in advance of and away from the core by an expansible and contractable chamber means operated in response to the movement of the core. When the core arrives in molding position, a vacuum means is automatically actuated to draw a vacuum within the core for sucking the molding portion onto the surface of the core, in which position it is molded into a finished article. Thereafter, it is contemplated that means will automatically trim and bead the article as it remains in molding position.

Referring now to the drawings for a more detailed description of the invention, one embodiment thereof is shown in a molding apparatus, generally indicated by the numeral 10.

As shown in FIGS. 1 to 3, the molding apparatus 10 for molding hollow articles from sheets of moldable material comprises a frame 11 having fixedly mounted thereon a material supporting member 12 adapted to engage a sheet of moldable material and define a molding portion 13 thereof. The material supporting member, while it may take any form adapted to facilitate the molding of a particular article, is here illustrated as an annular member having an opening 14 therein. The supporting member is formed, in the surface adapted to engage a sheet of moldable material, with an open annular groove 15, which defines the molding portion 13 of the sheet. The groove 15 is in open communication with a conduit connected to a suction pump or the like (not shown) and is adapted to have a vacuum drawn therein whereby the sheet of moldable material is retained in place on the surface of the supporting member 12.

Mounted by frame 11, at the side of supporting member 12 directed away from the sheet engaging surface thereof, is a carrier assembly 17 adapted to be shifted toward and away from the supporting member for moving a hollow forming die or core 18 between retracted and molding position relative thereto. While the carrier assembly may take any form adapted to produce the desired results, in the illustrated embodiment of the invention it comprises a pair of spaced parallel rods 19 longitudinally slidably mounted in a post 20 connected to frame 11 and an annular ring 21 connected to the rods at the side of post 20 adjacent the supporting member 12. The opposite ends of the rods are connected to a disk-like member 22 for maintaining them in spaced parallel relation and for other purposes to be hereinafter explained. The hollow forming core 18 is threadedly connected to annular ring 21 to extend outwardly therefrom parallel rods 19 in the direction of supporting member 12. In the retracted position of the forming core (see FIG. 2) the end 23 thereof is positioned within the opening 14 of the supporting member, but does not extend therethrough. Fixedly mounted within post 20 and extending outwardly therefrom into slidable sealing telescoped engagement with hollow core 18 is a guide 24, provided with a sealing ring 24a, and having a bore 25 longitudinally therethrough. Positioned within bore 25 is a rod 26 having its end, directed toward end 23 of the forming die, headed as at 27 to close the related end of bore 25 and its other end extending outwardly of the bore through a sealing cap 28. The outwardly extending end of rod 26 is threaded to receive nuts 29 which form an adjustable abutment for a coil spring 30 that seats on sealing cap 28. The spring functions to bias the rod to the left, as seen in FIG. 2, to retain head 27 in sealing engagement with the end of bore 25 to close the bore to the interior of forming core 18. Vacuum conduit 16 which is connected between a suction pump and the annular groove 15 of the supporting member 12 is in open connection with the bore 25 of guide 24 through an opening 31 in post 20 for drawing a vacuum therein for a purpose to be hereinafter described.

The carrier assembly 17, with forming core 18 affixed thereto is moved toward and away from supporting member 12 by means of the piston 32 of a fluid operating device 33 of any type commonly known to the art. It will, of course, be understood that other means such as solenoids and the like may be utilized to actuate the carrier assembly in lieu of a fluid type operating device. The piston 32 of the operating means is connected to the carrier assembly through the disk-like member 22 thereof and an operable extension 32a of the piston extends through the disk for engaging the end of rod 26 to unseat head 27 from bore 25 of guide 24 when the forming core is in molding position as will be more fully seen hereinafter.

Mounted on supporting member 12, and adapted to be operated by carrier assembly 17 in response to the movement of forming core 18 between retracted and molding position, is an expansible and contractable chamber 34 for distorting molding portion 13 of the moldable sheet in advance of and away from the end 23 of the forming die as the latter moves into molding position. While the expansible and contractable chamber may comprise a plunger and cylinder or the like, in the illustrated form of the invention it is shown as a bellows having one end sealingly secured to an annular neck 35 formed on supporting member 12 and its other end sealingly connected around the periphery of annular ring 21. It will be understood that as carrier assembly 17 moves toward supporting member 12 or to the right, as seen in FIG. 2, air will be expelled from bellows 34 around forming core 18 through opening 14 in the supporting member to blow or distort molding portion 13 of the sheet material in advance of and away from from the core, as shown in FIG. 3. When the forming core has arrived in molding position see FIG. 4) is it prevented from further movement toward molding portion 13 by the engagement of a rim 18a thereon with supporting member 12. At this point the molding portion has been distorted sufficiently for the subsequent molding operation. Continuing travel of carrier 17 causes the bore 25 of guide 24 to be opened, as previously described, to the interior of the die so that a vacuum is drawn therein. The vacuum, drawing through orifices 49 and ports 50 in the core, sucks molding portion 13 onto the surface thereof where it is molded.

In order to facilitate the operation of molding apparatus 10 and to automatically charge supporting member 12 with moldable sheet material, frame 11 is mounted through upright posts 36 on a base 37 and is adapted to be shifted relative thereto by means of a fluid pressure lift 38, of any type commonly known to the art, toward and away from a sheet material dispensing device 39, as shown in broken and solid lines in FIG. 1. While the sheet material dispensing device 39 may be of any type well known in the art, in the illustrated embodiment of the invention it is shown as a device of the type wherein a predetermined quantity of sheet material 40 is dispensed into engagement with supporting member 12 and thereafter severed from the supply roll or the like (not shown) by a blade 41 forming part of the device.

In order to further facilitate the automatic operation of the molding apparatus, trimming and beading means 42 are mounted on frame 11 and adapted to be shifted toward and away from supporting member 12 by means of a solenoid or fluid pressure device 43 after the article 13a has been molded on forming core 18. In the illustrated form of the invention (see FIGS. 4 and 5), trimming and beading means 42 comprises a cup-shaped or cylindrical member 44 adapted to receive within the bore 45 thereof the molding end 18b of the core. The open or leading edge of cup-shaped member 44 is inwardly beveled as at 46 to provide a cutting edge 47 whereby the excess moldable material 40a is trimmed from the finished molded article 13a between the surface of opening 14 of supporting member 12 and the outer surface of forming core 18, as best shown in FIG. 5. It will be seen in FIG. 4 that as a result of the configuration of forming core 18 a U-shaped flange 48 is formed on the finished molded article after the excess material is trimmed therefrom. This material is engaged by bevel 46 on cup 44 and folded inwardly to form a bead, as shown in FIG. 5.

In the operation of molding apparatus 10, frame 11 thereof is initially shifted toward the material dispensing device 39 to receive therefrom a charge of moldable sheet material. The charge of moldable sheet material is retained over the opening 14 of the supporting member by means of a vacuum drawn through annular groove 15 thereof and has defined therein by the annular groove, a molding portion 13. After the sheet of moldable material has been engaged by material supporting member 12, frame 11 is shifted away from material dispensing device 39 to its operating position and carrier assembly 17 is actuated to move the forming core 18 through opening 14 of the supporting member into molding position. Simultaneously with the movement of forming core 18 from retracted to molding position, bellows 34 is operated, in response to the movement of the core, by the carrier to force air around the core through opening 14 into molding portion 13 to distort or blow the latter in advance of and away from the core. After core 18 has been seated in molding position and is prevented from further movement through opening 14 of the supporting member by its outwardly extending rim 18a, the continued travel of the carrier toward the supporting member brings extension 32a of the carrier moving means 33 into engagement with the end of rod 26 whereby the head 27 thereof is displaced from the end of bore 25. A vacuum is then drawn within the molding end 18b of core 18 through bore 25, opening 31 in post 20 and vacuum conduit 16, by the suction pump. As a result of the orifices 49 and ports 50 provided in core 18, molding portion 13 is sucked onto the surface thereof to be there molded into a finished article 13a. It should here be noted, that by distorting the molding portion prior to contacting it with the die and before the vacuum is drawn, the material is conditioned to be evenly disposed on the molding surface of the die thereby eliminating strains and other weak areas. Thereafter, trimming and beading device 42 is shifted by means of solenoid 43 into operable position to trim the molded article and bead the edge thereof.

Thus, among others, the several objects of the invention as aforenoted are achieved. Obviously numerous changes in the structure may be resorted to without departing from the spirit of the invention as defined by the claims.

I claim:

1. An apparatus for molding articles from plastic sheet material comprising an annular material supporting member adapted to engage a moldable plastic sheet and define a molding portion thereof, vacuum means for retaining the peripheral edge of said molding portion in sealed engagement with said supporting member, a carrier member movable toward and away from said supporting member, a forming core mounted by said carrier member and movable thereby between retracted and molding position relative to said supporting member, said core in molding position extending through the opening of said annular supporting member for forming said molding portion into a finished molded article, bellows means having one end thereof sealingly connected to said supporting member and its other end sealingly connected to said carrier to be operated thereby as said carrier moves toward said supporting member, said bellows being adapted to uniformly distort said molding portion in advance of and away from said core as the latter moves into molding position, and vacuum means cooperating with said core for drawing said distorted molding portion into engagement with said core in the molding position thereof to mold said article thereon.

2. An apparatus for molding articles from plastic sheet material comprising an annular material supporting member adapted to engage a moldable plastic sheet and define a molding portion thereof, means for retaining the peripheral edge of said molding portion in sealed engagement with said supporting member, a carrier member movable toward and away from said supporting member, means for moving said carrier member, a forming core mounted on said carrier member and movable thereby between retracted and molding position relative to said supporting member, said core in molding position extending through the opening of said annular supporting member for forming said molding portion into a finished molded article, an expansible and contractable chamber separate from said core and connected to said carrier to be operated thereby for supplying fluid under pressure and uniformly distorting said molding portion in advance of and away from said core as the latter moves into molding position, and vacuum means including valve means operated by said means for moving said carrier and cooperating with said core for drawing said distorted molding portion into engagement with said core when the core is moved into the molding position to mold said article thereon.

3. An apparatus for molding articles from plastic sheet material comprising an annular material supporting member adapted to engage a moldable plastic sheet and define a molding portion thereof, vacuum means for retaining the peripheral edge of said molding portion in sealed engagement with said supporting member, a carrier member movable toward and away from said supporting member, means for moving said carrier member, a forming core mounted by said carrier member and movable thereby between retracted and molding position relative to said supporting member, said core in molding position extending through the opening of said annular supporting member for forming said molding portion into a finished molded article, a bellows mounted between said supporting member and said carrier and operated by the latter as said core is moved into molding position, said bellows being adapted to uniformly blow said molding portion in advance of and away from said core as the latter moves into molding position, vacuum means operated by said carrier moving means when said core is in molding position and cooperating with said core for drawing said blown molding portion into engagement therewith to mold said article thereon, and means movable toward said supporting member and cooperating therewith for trimming said finished molded article.

4. An apparatus for molding articles from plastic sheet material comprising a frame, an annular material supporting member mounted on said frame and adapted to engage a moldable plastic sheet and define a molding portion thereof, means for retaining the peripheral edge of said molding portion in sealed engagement with said supporting member, a carrier member mounted by said frame and movable relative thereto toward and away from said supporting member, a forming core mounted on said carrier member and movable thereby between retracted and molding position relative said supporting member, said core in molding position extending through the opening of said annular supporting member for forming said molding portion into a finished molded article, an expansible and contractable chamber separate from said core mounted on said frame and connected to said carrier and operated in response to movement of said carrier, contraction of said chamber supplying fluid under pressure for uniformly blowing said molding portion in advance of and away from said core as the latter moves into molding position, vacuum means operably associated with said core and cooperating therewith in the molding position of said core for drawing said molding portion into engagement with said core to mold said article thereon.

5. An apparatus for molding articles from plastic sheet material comprising a frame, an annular material supporting member mounted on said frame and adapted to engage a moldable plastic sheet, means for shifting said frame relative a source of sheet supply for engaging a sheet with said supporting member, said supporting member defining a molding portion thereof, vacuum means for retaining the peripheral edge of said molding portion in sealed engagement with said supporting member, a carrier member mounted by said frame and movable relative thereto toward and away from said supporting member, means for moving said carrier member, a forming core mounted by said carrier member and movable thereby between retracted and molding position relative said supporting member, said core in molding position extending through the opening of said annular supporting member for forming said molding portion into a finished molded article, bellows means mounted between said supporting member and said carrier, and operated by the latter as said core is moved into molding position, said bellows means being adapted to uniformly blow said molding portion away from said core in advance thereof, vacuum means operated by said carrier moving means and cooperating with said core for drawing said blown molding portion into engagement with said core in the molding position thereof to mold said article thereon, and means mounted by said frame and movable relative thereto for trimming said finished molded article and beading the trimmed edge thereof.

6. A method for molding articles from plastic sheet material comprising the steps of stretching a sheet of moldable plastic across an annular material supporting member for defining a molding portion thereof, drawing a vacuum through said supporting member for retaining the peripheral edge of said molding portion in sealed engagement therewith, moving a forming member toward said molding portion into engagement with said supporting member to extend therethrough, supplying fluid under pressure for blowing said molding portion in response to the movement of said forming member into engagement with said supporting member by means separate from the forming member to uniformly distort the molding portion away from the forming member, drawing a vacuum in cooperation with said forming member when the forming member is in forming position to form said molding portion into engagement with said forming member in the support engaging position of the latter to mold a finished article thereon and, while on the forming member, simultaneously trimming the molded article from the sheet and rolling the edge as an incident to the trimming operation to form a closed bead thereon.

7. An apparatus for molding articles from plastic sheet material comprising a material supporting member having an opening therein adapted to engage a moldable plastic sheet and define a circular molding portion thereof, means for retaining the peripheral edge of said molding portion in sealed engagement with said supporting member, a forming core movable between retracted and molding position relative to said supporting member, said core in molding position extending through the opening of said supporting member and cooperating with said molding portion to mold said portion into a finished molded article, expandable and contractable chamber means separate from said forming core and operated incident to the movement of the core for supplying fluid under pressure for uniformly distorting said molding portion in advance of and away from said core as the latter moves into molding position, vacuum means cooperating with said core for drawing said distorted molded portion into engagement with said core in the molding position to mold said article thereon, and means movable into cooperation with said supporting member adjacent said opening for severing said molded article from said sheet, said last named means being formed with a cutting edge having a rolling portion adjacent said cutting edge, said rolling portion being inclined toward the molded article for simultaneously turning the severed edge of the article into a closed bead.

8. The invention as defined in claim 2 wherein the valve means comprises a normally closed valve for communicating the interior of the core with a source of vacuum and operating means operable by and in response to the movement of the core into molding position for automatically applying said vacuum to the core in the molding position.

References Cited in the file of this patent

UNITED STATES PATENTS

| | | |
|---|---|---|
| 1,702,990 | Allen | Feb. 19, 1929 |
| 2,081,777 | Talalay | May 25, 1937 |
| 2,114,596 | Franghia | Apr. 19, 1938 |
| 2,259,508 | Abramson | Oct. 21, 1941 |
| 2,272,920 | Merta | Feb. 10, 1942 |
| 2,891,280 | Politis | June 23, 1959 |
| 2,912,718 | Thiel | Nov. 17, 1959 |
| 2,953,814 | Mumford | Sept. 27, 1960 |

FOREIGN PATENTS

| | | |
|---|---|---|
| 220,241 | Australia | Feb. 16, 1959 |
| 808,389 | Great Britain | Feb. 4, 1959 |

OTHER REFERENCES

Williams: "Problems Related to the Thermo-Forming of Toughened Polystyrene Sheet," British Plastics, December 1958, pages 518–521.